(12) United States Patent
Manner

(10) Patent No.: US 6,337,903 B1
(45) Date of Patent: Jan. 8, 2002

(54) CALL SETUP FOR PREPAID SERVICES

(75) Inventor: Juha-Pekka Manner, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/391,981

(22) Filed: Sep. 9, 1999

Related U.S. Application Data

(63) Continuation of application No. PCT/FI98/00235, filed on Mar. 17, 1998.

(30) Foreign Application Priority Data

Mar. 25, 1997 (FI) .................................................. 971241

(51) Int. Cl.$^7$ .......................... H01M 15/00; H04Q 7/38
(52) U.S. Cl. ............. 379/144.01; 379/111; 379/114.17; 379/114.2; 379/121.03; 455/405
(58) Field of Search ................... 379/114, 120, 379/121, 123, 127, 130, 143, 144, 91.01, 91.02, 93.02, 93.03, 111, 114.01, 114.05, 114.15, 114.17, 114.2, 114.28, 114.29, 121.03, 144.01; 455/405, 406, 409

(56) References Cited

U.S. PATENT DOCUMENTS

| | | | | |
|---|---|---|---|---|
| 4,706,275 A | * | 11/1987 | Kamil | 379/144 |
| 5,351,290 A | | 9/1994 | Naeini et al. | 379/145 |
| 5,353,335 A | * | 10/1994 | D'Urso et al. | 379/67.1 |
| 5,408,519 A | | 4/1995 | Pierce et al. | 379/120 |
| 5,592,535 A | | 1/1997 | Klotz | |
| 5,774,533 A | * | 6/1998 | Patel | 379/127 |
| 5,774,535 A | * | 6/1998 | Castro | 379/144 |
| 5,854,975 A | * | 12/1998 | Fougnies et al. | 455/408 |
| 5,903,633 A | * | 5/1999 | Lorsch | 379/114 |
| 5,991,384 A | * | 11/1999 | Wulkan | 379/144 |

FOREIGN PATENT DOCUMENTS

| | | | |
|---|---|---|---|
| EP | 0 742 663 A2 | 11/1996 | H04M/3/50 |
| FI | 945346 | 11/1994 | H04M/17/00 |
| WO | WO 96/15616 | 5/1996 | H04M/15/00 |
| WO | WO 96/15633 | 5/1996 | H04Q/3/00 |

* cited by examiner

*Primary Examiner*—Binh Tieu
(74) *Attorney, Agent, or Firm*—Altera Law Group, LLC

(57) ABSTRACT

The invention relates to the provision of prepaid services for the customers of a telecommunication network operator in a wired and/or mobile telephone network. The invention makes it possible to implement prepaid call services even in countries with a low level of development of telephony. In the procedure of the invention, it is not necessary to identify e.g. DTMF tones, but the normal dialling system can be used to the verification of right of use of the service.

9 Claims, 2 Drawing Sheets

CALL SETUP FOR PREPAID SERVICES

This application is a continuation of PCT/FI98/00235, filed Mar. 17, 1998.

FIELD OF THE INVENTION

The present invention relates to a procedure for setting up a call in telephone network using a predetermined right of use of the telephone network.

DESCRIPTION OF RELATED ART

An essential part of operating a telephone network is the system of charging the user for the calls. There are several different prior-art methods and systems that allow a telephone network operator to invoice a customer using the operator's telephone network in advance. In a certain system, prepaid call cards or equivalent are used, in which case the customer buys at a resale point a call card bearing stored conversation time data corresponding to the price of the call card. For the use of a call card, a terminal comprising equipment for reading the call card and updating the conversation time data on it are needed. On the other hand, it would be possible to use e.g. DTMF tones to transmit the information that the customer using the telephone network has paid for the call in advance. However, such solutions involve the problem that in countries having a low level of development of telephony there is but a small number of DTMF telephones in use, so this system cannot be used to implement services intended for a large number of users. Moreover, reliable identification of pulse dialling signals is not possible because of poor connections or identification of tones is not possible because of poor quality of connections and terminal equipment. A further problem in the countries referred to is that telephone exchanges rarely verify the correctness of the A-subscriber number of the calling subscription. In the call record, only the A-subscriber number sent by a private automatic branch exchange is recorded, so the charge for the call is debited to this A-subscriber number. However, it is possible to program the PABX so that the A-subscriber number sent to the exchange will be changed e.g. once every hour. In this case, a series of different A-subscriber numbers can be selected to be sent by turns, which means that the charges for the calls will also be collected with bills corresponding to these A-subscriber numbers.

SUMMARY OF THE INVENTION

The object of the present invention is to eliminate the problems described above.

A specific object of the present invention is to disclose a procedure that makes it possible to implement an arrangement useful for customers and telecommunication network operators, a so-called prepaid service, in which the customer pays in advance for conversation time to be used. A further object of the invention is to disclose an arrangement that allows such a prepaid service to be implemented even in countries underdeveloped in respect of telephony. Yet another object of the invention is to enable telephone services to be made available even to customers not considered creditworthy, so that they could be offered conversation time without advance payment.

A further object of the invention is to prevent the kind of abuse described above, in which the A-subscriber number sent by a PABX is changed e.g. hourly. It can be further stated about the objects of the invention that a service achieved by applying the procedure of the invention is easy to implement in a technical sense and economical to both operator and customer.

As for the features characteristic of the invention, reference is made to the claims.

In call setup according to the procedure of the invention for setting up a call in a telephone network using a predetermined right of use of the telephone network, the subscriber number of the calling subscriber, i.e. A-subscriber, and the subscriber number of the called subscriber, i.e. B-subscriber, are sent into the telephone network. These subscriber numbers can be sent in the fields normally reserved for them in the call setup signalling. Further, in the procedure of the invention, the A-subscriber's right of use is verified before call setup. This generally means checking that the A-subscriber has either paid beforehand for his/her right of use e.g. via a call card or that the A-subscriber has a right of use based on credit.

According to the invention, in conjunction with call setup, the procedure adds to the B-subscriber number to be sent into the telephone network a character string from which it can be established in the telephone network that the caller is an A-subscriber who is using a predetermined right of use, and which comprises an A-subscriber-specific identifying code. In practical call setup, this character string can be added e.g. by entering it before the B-subscriber number via the terminal device, or, on the other hand, the character string can be added automatically e.g. by using a sequence programmed in the PABX. Further, according to the invention, the A-subscriber's right of use is verified in the telephone network on the basis of the A-subscriber-specific identifying code. Now, if the A-subscriber has a right of use, i.e. the A-subscriber has paid for use of the telephone network in advance, then the call setup process between the A and B subscribers is continued in the normal manner. In a preferred case, the A-subscriber's right of use is verified by identifying the subscriber based on the A-subscriber number and comparing the identifying code attached to the B-subscriber number with the A-subscriber's identifying codes in the telephone network. In addition, if the identifying code is correct, a check is carried out to establish whether the A-subscriber has a valid right of use. If these checks indicate that the A-subscriber's code is not correct or that the A-subscriber has no valid right of use, then the call can be directed to a predetermined subscriber number from which the A-subscriber can be given a notice either about the incorrectness of the identifying code or about the insufficiency of the balance on his/her account and asked to make a further payment.

As compared with prior art, the procedure of the present invention provides the advantage that prepaid calls can be made available to the customers of a teleoperator without the use of separate call cards or corresponding media. Further, the invention makes it possible to realise an arrangement that works even in countries underdeveloped in respect of telephony and that can be utilised to implement prepaid telephone services.

A further advantage of the present invention is that the invention makes it possible to prevent the practice of a certain kind of deceit in the telephone network. The invention allows the subscriber numbers in the telephone network to be protected by means of identifying codes so that a given subscriber number can only be used if one knows the identifying code associated with it. This is particularly relevant in a situation where a PABX with a character string according to the invention preprogrammed in it is used, which character string is sent into the network and used to identify the caller as an A-subscriber utilising a predetermined right of use.

In an embodiment of the present invention, the expenditure of the right of use or balance available to the subscriber is monitored. If the balance or right of use is exhausted, either the caller is requested to deposit more money, whereupon the call is broken off, or the call is simply broken off. In a preferred embodiment, after a normal call, the balance or right of use associated with the A-subscriber number must be updated and the identifying code used must be removed from the database. In this case, the identifying code is an expendable one and a new identifying code must be used every time when a new call is set up. On the other hand, in an embodiment of the invention, the identifying code may be valid for e.g. for a given predetermined period of time, in which case, by using this identifying code, the subscriber can make an unlimited amount of calls, provided that the balance or right of use has not been exhausted.

The right of use can be defined in terms of available conversation time a monetary balance dependent on conversation time, number of units or equivalent. Further, the right of use is preferably decreased on the basis of data stored with the call data, such as location of the B-subscriber, i.e. whether the call is a local call or a long-distance call, duration of the call, starting time of the call or corresponding data.

Further, in an embodiment of the invention, a subscriber number may be associated with several series of identifying codes. In this case, each series of identifying codes comprises one or more identifying codes, each series of identifying codes being used by sending a valid identifying code from the identifying code series in question. This is particularly advantageous in cases where a single terminal and a single subscriber number are used by more than one user. Thus, a specific series of identifying codes and an associated right of use can be defined for each user.

BRIEF DESCRIPTION OF THE DRAWINGS

In the following, the invention will be described by the aid of a few preferred embodiments by referring to the attached drawing, in which.

DETAILED DESCRIPTION OF THE INVENTION

Figure 1:
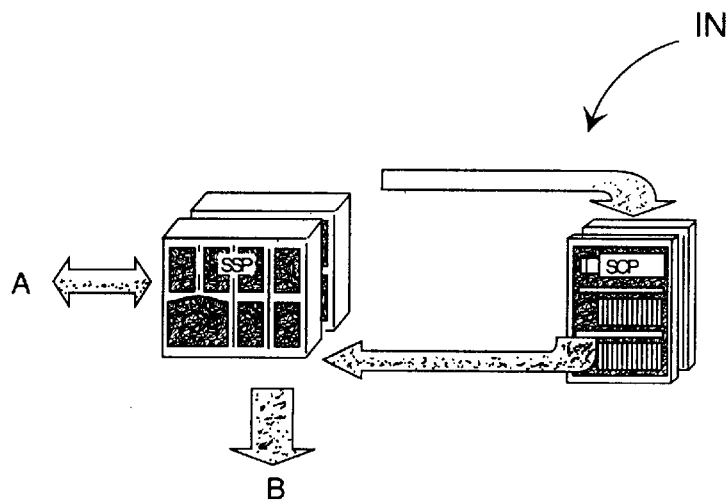
FIG. 1 is a diagram representing call: setup according to the invention.

FIG. 1 presents in diagrammatic form the essential telephone network components that are needed to implement the procedure of the invention. The procedure of the invention is preferably implemented using a so-called intelligent network. FIG. 1 presents the two essential components of an intelligent network IN, a service switching point SSP and a service control point SCP. To the intelligent network it is possible to connect peripherals, such as a computer (not shown), which can be utilised in implementing the procedure of the invention. The setup of a prepaid call as illustrated by FIG. 1 is carried out as follows. When starting a call, the A-subscriber dials a prefix in front of the B-subscriber number, indicating that a prepaid service is being used. Based on this, the call is directed to the intelligent network IN, arrow A, and within the intelligent network to the service switching point SSP. The service switching point SSP directs the call further to the service control point SCP, which carries out checking functions designed to verify whether the A-subscriber has conversation time left. The intelligent network preferably comprises database media that contain the identifying codes PIN corresponding to the A-subscriber numbers and from which the A-subscriber's identifying code can be read and verified. In addition, a conversation time balance for the A-subscriber and a limit value corresponding to the balance are preferably also stored on the database media. The limit value may be set to the end of conversation time or it may be so set that when the limit is reached, the subscriber still has some conversation time left so that an ongoing call can be finished.

When the service switching point SSP receives from the service control point SCP information indicating that the identifying code supplied by the A-subscriber is correct and the A-subscriber has conversation time left, the service switching point will go on with the call setup procedure in the normal manner, arrow B. If the identifying code entered by the A-subscriber had been incorrect or if the A-subscriber had not had any conversation time left, the service control point SCP would have informed the service switching point SSP about this. Based on this, the service switching point SSP would have connected the call started by the A-subscriber to a predetermined subscriber line that sends e.g. a recorded message "identifying code incorrect" or "no conversation time left, please reserve more conversation time" and then terminated the call setup.

Figure 2:
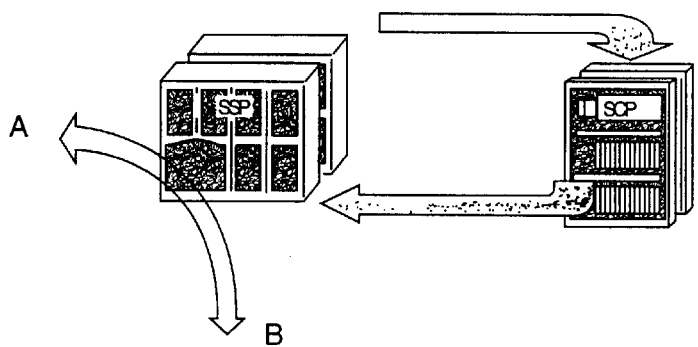
FIG. 2 is a diagram representing an ongoing call according to the invention.

Referring to FIG. 2, arrow A-B represents an ongoing call between an A-subscriber and a B-subscriber. In this example, the balance for the A-subscriber is decreased in certain steps during the call. If the service control point SCP detects that the balance is no longer sufficient to allow a decrement, the database is checked to see if the A-subscriber has any additional conversation time stored in it. If the A-subscriber has conversation time left, possibly the magnitude of the decrement is changed and the debiting for the call is continued based on the new decrement.

Figure 3:
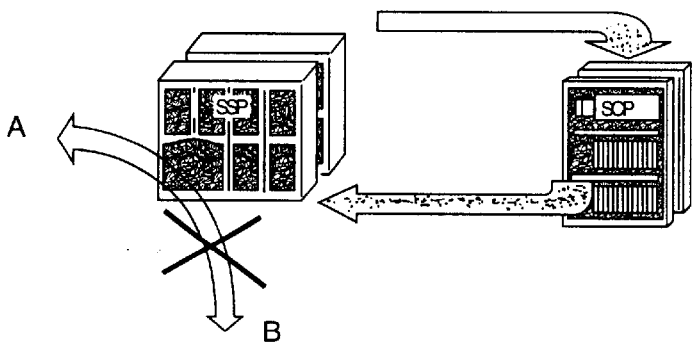
FIG. 3 presents an embodiment of the invention in which the right of use falls short of a predetermined limit.

Referring now to FIG. 3, a situation will be described where the balance is exhausted during a normal call and no money is left. In this case, the service control point SCP sends the service switching point SSP a message that causes the service switching point to break off the call. The arrangement further comprises actions that prevent all subsequent call attempts by the A-subscriber until the latter has stored additional conversation time for him/herself.

Furthermore, in conjunction with the procedure of the invention, it is possible to use messages like the following at different points during the call. At the beginning of a call, when the remaining conversation time reaches a predetermined notice limit, it is possible to give a message like "You are about to run out of conversation time", and/or when the conversation time has been exhausted, a message like "You are out of conversation time. Please contact your teleoperator". Further, when the conversation time limit is reached, the call can be broken off or it can be continued as normal depending on the agreement between the customer and the teleoperator. On the other hand, in this situation, calls can be routed to a predetermined number at which the customer can e.g. make a payment to reserve more conversation time. Further, in a preferred embodiment of the invention, conversation time may depend on the point of time so that the subscriber pays a certain sum to the operator and receives a series of identifying codes that can be used e.g. for a month or until the deposit has been exhausted.

Figure 4:
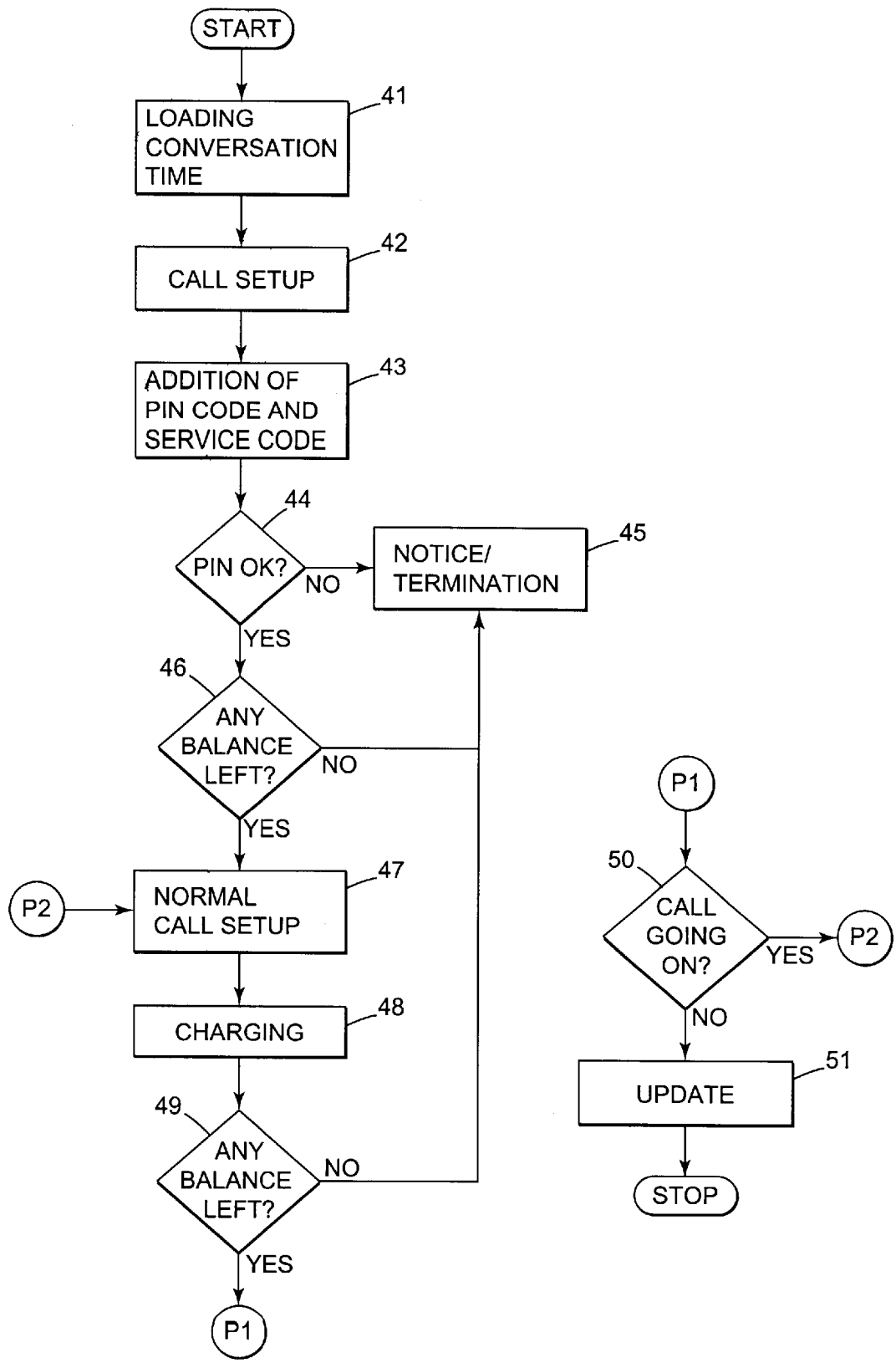
FIG. 4 presents a flow chart representing a call process according to the invention.

Referring to FIG. 4, a preferred example of call setup and call process according to the invention is presented in the form a flow chart. At the beginning, the customer makes an advance payment for conversation time, block 41, whereupon the operator gives the customer a series of identifying codes and stores on database media the identifying codes and the conversation time corresponding to the amount of money paid by the customer. After this, call setup is started, block 42. In block 43, the A-subscriber dials a number, adding in conjunction with the B-subscriber number, e.g. before it, a prefix that tells the telephone network that the subscriber wishes to use his/her prepaid conversation time. Moreover, at this stage the A-subscriber adds to the dialled number an identifying code that is valid at the time. Next, the call is directed within the telephone network to an intelligent network IN, where the identifying code supplied by the A-subscriber is tested for correctness, block 44. If the identifying code is incorrect, then the A-subscriber will be given a notice saying that the identifying code is incorrect, whereupon the call setup is terminated. If it is established in block 44 that the identifying code is correct, then the process will advance to block 45, where a test is carried out to determine whether the A-subscriber has conversation time left. If the customer's conversation time has been exhausted, control will be passed to block 45 and the above-mentioned actions will be performed. If conversation time is available, the process will advance to block 47 and call setup will be continued in the normal way. After this, while the call is going on as normal, in block 48, the A-subscriber is charged for the call by decreasing his/her conversation time according to a predetermined principle. From block 47 in the flow chart, the process goes on to block 48, where a check is again carried out to see if the A-subscriber has any balance left. If the balance has been exhausted, the process will go on to block 45, where the customer is again given a notice, which may be different than the one mentioned above or some other message and the call setup is terminated. If, in block 49, the customer still has a balance, the call will be continued and in block 50 a test is performed to determine whether the call is still going on. If the call is going on, the process will continue further in the loop, returning to block 48. If it is detected in block 50 that the call is no longer going on, control will be passed to block Si, where the A-subscriber's balance and identifying code are updated in the database. The updating comprises removing the identifying code used for the call and the required actions to decrease the A-subscriber's conversation time.

The invention is not restricted to the examples presented above, but many embodiments not described here are possible within the scope of the inventive idea defined by the claims.

What is claimed is:

1. A method for setting up a call in a telephone network using a predetermined right of use of the telephone network, in which method the subscriber number of the calling subscriber and the subscriber number of the called subscriber are sent into the telephone network and the calling subscriber's right of use is verified before the call is set up, comprising:

adding a character string to the called subscriber number to be sent into the telephone network in conjunction with call setup for establishing from said character string in the telephone network that the caller is a calling subscriber who is utilizing a predetermined right of use and said character string comprises a calling subscriber-specific identifying code (PIN) corresponding to the calling subscriber number;

verifying the calling subscriber's right of use in the telephone network on the basis of the calling subscriber-specific identifying code by comparing the identifying code (PIN) sent in conjunction with call setup with the identifying codes corresponding to the calling subscriber number;

if the identifying code is correct checking the calling subscriber's remaining right of use and, if no right of use remains, giving a corresponding notice to the calling subscriber and terminating call setup; and if the calling subscriber has a remaining right of use, then continuing the call setup process between the calling subscriber and the called subscriber in the normal way.

2. The method as defined in claim 1, wherein one or more identifying codes (PIN) and a corresponding right of use are defined for the calling subscriber in the telephone network.

3. The method as defined in claim 1, wherein, during an ongoing call, monitoring the amount of the calling subscriber's right of use and, when the amount of right of use falls below a predetermined limit value, giving a notice to the calling subscriber and continuing the call for a predetermined period of time or disconnecting the call.

4. The method as defined in claim 1, wherein, after the call has been finished, updating the data concerning the calling subscriber's identifying code (PIN) and right of use.

5. The method as defined in claim 1, wherein the updating comprises removing the identifying code (PIN) sent in conjunction with call setup and decreasing the amount of the calling subscriber's right of use on the basis of parameters related to the call.

6. The method as defined in claim 1, wherein the identifying code (PIN) is of an expendable nature.

7. The method as defined in claim 1, wherein the identifying code (PIN) is valid for a predetermined period of time.

8. The method as defined in claim 1, wherein the calling subscriber number is associated with several series of identifying codes, each series comprising one or more identifying codes (PIN), said series of identifying codes being used by sending a valid identifying code from a given identifying code series.

9. The method as defined in claim 1, wherein the right of use is defined in terms of available conversation time, a monetary amount of balance depending on conversation time or equivalent; and that the right of use is decreased based on data stored with the call data, such as location of the called subscriber, duration of the call, time of the call or corresponding data.

* * * * *